US009517437B2

(12) United States Patent
Devarakonda (10) Patent No.: US 9,517,437 B2
(45) Date of Patent: Dec. 13, 2016

(54) SYSTEMS AND METHODS FOR CONTROLLING AFTERTREATMENT SYSTEMS (71) Applicant: General Electric Company, Schenectady, NY (US)

(72) Inventor: Maruthi Narasinga Rao Devarakonda, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/635,816

(22) Filed: Mar. 2, 2015

(65) Prior Publication Data
US 2016/0256823 A1 Sep. 8, 2016

(51) Int. Cl.
*B01D 53/94* (2006.01)
*F01N 3/18* (2006.01)
*F01N 3/20* (2006.01)

(52) U.S. Cl.
CPC ....... B01D 53/9495 (2013.01); B01D 53/9431 (2013.01); B01D 53/9477 (2013.01)

(58) Field of Classification Search
CPC ............ B01D 53/9418; B01D 53/9436; B01D 53/9495; F01N 3/0807; F01N 3/18; F01N 3/206; F01N 3/208; F01N 3/0814
See application file for complete search history.

(56) References Cited

U.S. PATENT DOCUMENTS 6,001,318 A * 12/1999 Tillaart .............. B01D 53/9409
423/212
8,375,700 B2 * 2/2013 Sisken .................... F01N 3/208
60/274

(Continued)

FOREIGN PATENT DOCUMENTS

CN          102216582 A  * 10/2011    ......... B01D 53/9468
EP            2181756 B1  * 12/2014    ............. B01D 53/90

(Continued)

OTHER PUBLICATIONS

EP Extended Search Report; Application No. EP 16158069.1; Dated Jul. 20, 2016; 5 pages.

*Primary Examiner* — Timothy Vanoy
(74) *Attorney, Agent, or Firm* — Fletcher Yoder, P.C.

(57) ABSTRACT

A system includes a nitrogen oxide reduction catalyst fluidly coupled to an exhaust conduit of an engine system. The nitrogen oxide reduction catalyst is configured to reduce nitrogen oxides in an engine exhaust. The system also includes an ammonia oxidation catalyst fluidly coupled to the exhaust conduit downstream of the nitrogen oxide reduction catalyst and configured to reduce ammonia in the engine exhaust. Further, the system includes a reductant injection control system configured to control an injection of reductant into the exhaust conduit, determine a first nitrogen oxide conversion rate of the nitrogen oxide reduction catalyst, determine an ammonia storage value of the nitrogen oxide reduction catalyst, and determine a first temperature of the engine exhaust upstream of the ammonia oxidation catalyst. The reductant injection control system is also configured to increase or decrease the injection of reductant based on the first nitrogen oxide conversion, the ammonia storage value, and the first temperature.

20 Claims, 4 Drawing Sheets

(56) References Cited

U.S. PATENT DOCUMENTS

| | | | |
|---|---|---|---|
| 2010/0024390 A1* | 2/2010 | Wills | F01N 13/009 60/274 |
| 2014/0020364 A1* | 1/2014 | Wittrock | F01N 13/0093 60/274 |
| 2014/0325968 A1* | 11/2014 | Suzuki | F01N 3/208 60/286 |

FOREIGN PATENT DOCUMENTS

| | | | |
|---|---|---|---|
| WO | 2009/135060 A2 | 11/2009 | |
| WO | WO 2010062730 A2 * | 6/2010 | B01D 53/9468 |
| WO | 2013/134539 A1 | 9/2013 | |

\* cited by examiner

SYSTEMS AND METHODS FOR CONTROLLING AFTERTREATMENT SYSTEMS

BACKGROUND

The subject matter disclosed herein relates to power generation systems. Specifically, the embodiments described herein relate to improving aftertreatment systems within power generation systems.

Many power generation systems utilize an aftertreatment system to condition the exhaust gases generated by the power generation system. In particular, aftertreatment systems may be used to reduce certain types of emissions by converting exhaust gases produced by the power generation system into other types of gases or liquids. For example, aftertreatment systems may be used to reduce the amount of nitrogen oxides within the exhaust gases.

To reduce the amount of nitrogen oxides in the exhaust gases, an aftertreatment system may include a nitrogen oxide ($NO_x$) reduction catalyst and an ammonia oxidation catalyst, which reduce the amount of nitrogen oxides and ammonia in the exhaust gases, respectively. Further, the aftertreatment system may also inject a fluid, such as urea, into the exhaust gases to facilitate the reduction of the nitrogen oxides and ammonia. It would be beneficial to improve the $NO_x$ conversion rate across an aftertreatment system for a power generation system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a nitrogen oxide reduction catalyst fluidly coupled to an exhaust conduit of an engine system and configured to reduce nitrogen oxides in the engine exhaust, and an ammonia oxidation catalyst fluidly coupled to the exhaust conduit downstream of the nitrogen oxide reduction catalyst and configured to reduce an ammonia in the engine exhaust. Further, the system includes a reductant injection control system configured to control an injection of reductant into the exhaust conduit, determine a nitrogen oxide conversion rate of the nitrogen oxide reduction catalyst, determine an ammonia storage value of the nitrogen oxide reduction catalyst, and determine a first temperature of the engine exhaust upstream of the ammonia oxidation catalyst. The reductant injection control system is also configured to increase, decrease, or a combination thereof, the injection of reductant based on the nitrogen oxide conversion rate, the ammonia storage value, and the first temperature.

In a second embodiment, a method includes controlling a reductant injection into an engine exhaust and determining a nitrogen oxide conversion rate and an ammonia storage value of a nitrogen oxide reduction catalyst configured to receive the engine exhaust and reduce nitrogen oxides in the engine exhaust. The method also includes receiving a first input corresponding to a first temperature upstream of an ammonia oxidation catalyst fluidly coupled to the nitrogen oxide catalyst, wherein the ammonia oxidation catalyst is downstream of the nitrogen oxide catalyst and configured to reduce ammonia in the engine exhaust. Further, the method includes increasing or decreasing the reductant injection based on the nitrogen oxide conversion rate, the ammonia storage value, and the first temperature.

In a third embodiment, a non-transitory computer-readable medium includes computer executable code. The computer executable code includes instructions configured to control a reductant injection into an engine exhaust and determine a nitrogen oxide conversion rate and an ammonia storage value of a nitrogen oxide catalyst configured to receive the engine exhaust and reduce nitrogen oxides in the engine exhaust. The computer executable code also includes instructions configured to receive a first input corresponding to a first temperature upstream of an ammonia oxidation catalyst fluidly coupled to the nitrogen oxide catalyst, wherein the ammonia oxidation catalyst is downstream of the nitrogen oxide catalyst and configured to reduce ammonia in the engine exhaust. Further, the computer executable code includes instructions configured to increase or decrease the reductant injection based on the nitrogen oxide conversion rate, the ammonia storage value, and the first temperature.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Many power generation systems use an aftertreatment system to condition the exhaust gases generated by the power generation system. For instance, certain power generation systems utilize aftertreatment systems that are designed to reduce the amount of nitrogen oxides in the exhaust gases. These aftertreatment systems may include a nitrogen oxide ($NO_x$) reduction catalyst and an ammonia oxidation catalyst. Prior to entering the catalysts, the exhaust gases may be mixed with urea, or some other type of fluid that prompts the desired chemical reactions. The exhaust gas-urea mixture then enters and reacts with the catalysts to generate the desired conversions (i.e., reducing nitrogen oxides and ammonia to carbon dioxide, water, etc.).

To improve the conversion rates of the catalysts, present embodiments of the aftertreatment system include a urea injection control system. The urea injection control system evaluates the operating characteristics (e.g., current conversion rate, current temperature at one or more locations, flow rates, etc.) of the catalysts and adjusts the amount of urea injected into the exhaust gases based on the operating characteristics of the catalysts and a desired conversion rate for the aftertreatment system. The urea injection control system also controls the operating window for certain characteristics of the catalysts based on the desired conversion rate. Further, in certain embodiments, the data collected by the urea injection control system may be used to perform diagnostic evaluations of the various components of the aftertreatment system and execute various actions (e.g., alarms, alerts, corrective actions) if necessary.

Figure 1:
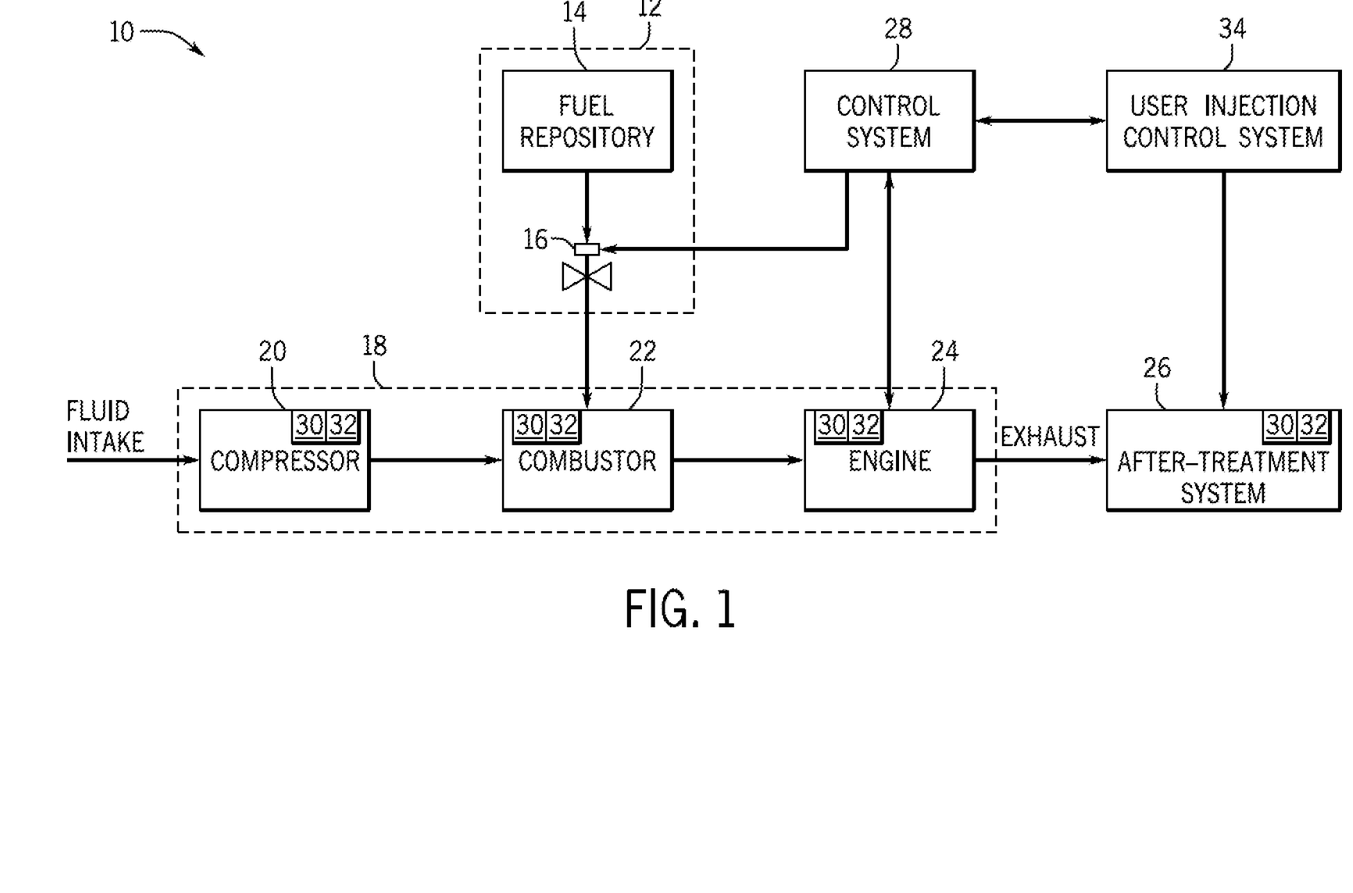
FIG. 1 is a schematic view of a power generation system, in accordance with an embodiment of the present approach.

With the foregoing in mind, FIG. 1 depicts a power generation system 10 that may be used to provide power to a load, such as an electric generator, a mechanical load, and the like. The power generation system 10 includes a fuel supply system 12, which in turn includes a fuel repository 14 and a throttle 16 that controls the fuel flow from the fuel repository 14 and into the power generation system 10. The power generation system 10 also includes an engine system 18 which includes a compressor 20, a combustor 22, and a gas engine 24. Further, the power generation system 10 includes an aftertreatment system 26, which is described in further detail below.

The power generation system 10 also includes a control system 28 which monitors various aspects of the operation of the power generation system 10. In particular, the control system 28 may work in conjunction with sensors 30 and actuators 32 to monitor and adjust the operation of the power generation system 10. For instance, various types of sensors 30, such as temperature sensors, oxygen sensors, fluid flow sensors, mass flow sensors, fluid composition sensors, and/or pressure sensors may be disposed on or in the components of the power generation system 10, and the throttle 16 is a specific actuator 32. Although the power generation system 10 is described as a gas engine system, it should be appreciated that other types of power generation systems (e.g., turbines, cold-day systems, combined cycle systems, co-generation systems, etc.) may be used and include the control system 28, aftertreatment system 26, and urea injection control system 34.

During operation, the fuel supply system 12 may provide fuel to the engine system 18 and, specifically, the combustor 22, via the throttle 16. Concurrently, the compressor 20 may intake a fluid (e.g., air or other oxidant), which is compressed before it is sent to the combustor 22. Within the combustor 22, the received fuel mixes with the compressed fluid to create a fluid-fuel mixture which then combusts before flowing into the gas engine 24. The combusted fluid-fuel mixture drives the gas engine 24, which in turn produces power for suitable for driving a load. For example, the gas engine 24 may in turn drive a shaft connected to the load, such as a generator for producing energy. It is to be understood that the gas engine 24 may include internal combustion engines, gas turbine engines, and the like.

The combustion gases produced by the gas engine 24 exit the engine and vent as exhaust gases into the aftertreatment system 26. In present embodiments, the exhaust gases pass through one or more catalytic converter systems, which will be described in further detail below. In some embodiments, the exhaust gases may also pass through a heat recovery steam generator (HRSG), which may recover the heat from the exhaust gases to produce steam. To monitor and adjust the performance of the aftertreatment system 26, the power generation system 10 includes a urea injection control system 34, which is described in further detail below.

Figure 2:
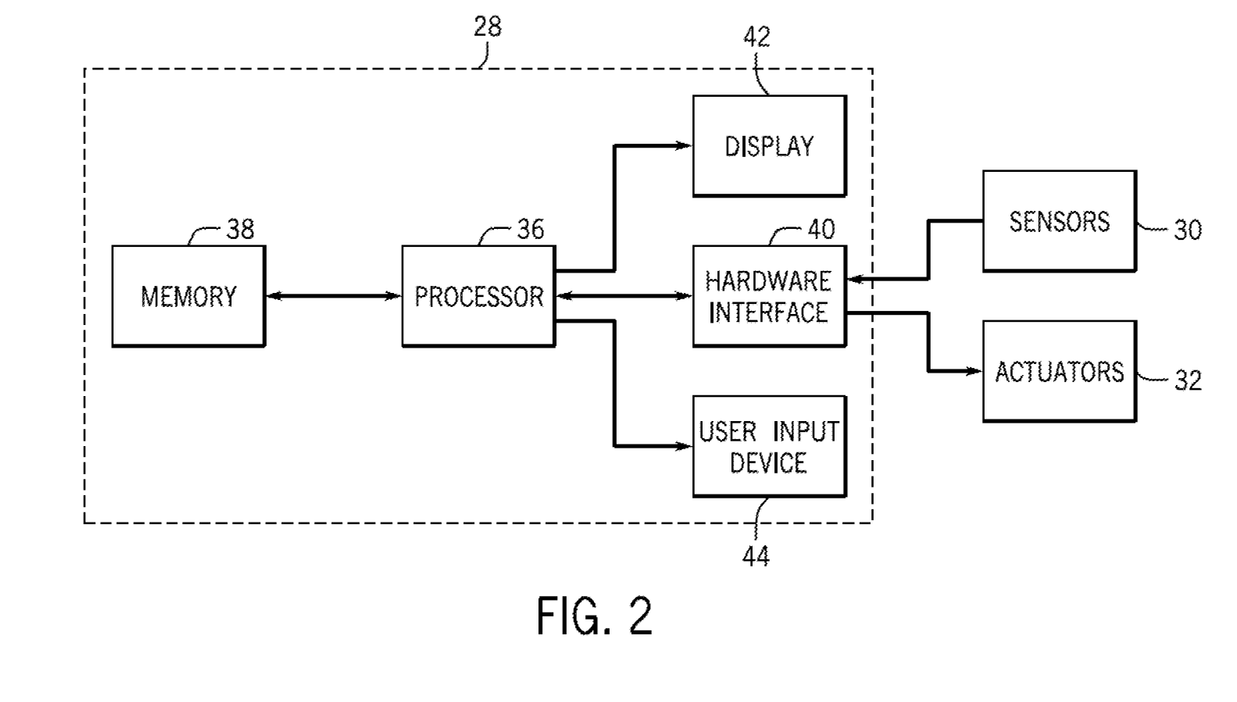
FIG. 2 is a block diagram of a control system for the power generation system of FIG. 1, in accordance with an embodiment of the present approach.

As mentioned earlier, the control system 28 oversees the operation of the power generation system 10. The control system 28 includes a processor 36, memory 38, and a hardware interface 40, as shown in FIG. 2. As depicted, the processor 36 and/or other data processing circuitry may be operably coupled to memory 38 to retrieve and execute instructions for managing the power generation system 10. For example, these instructions may be encoded in programs that are stored in memory 38, and the memory 38 may be an example of a tangible, non-transitory computer-readable medium. The instructions or code may be accessed and executed by the processor 36 to allow for the presently disclosed techniques to be executed. The memory 38 may be a mass storage device, a FLASH memory device, removable memory, or any other non-transitory computer-readable medium suitable for storing executable instructions or code. Additionally and/or alternatively, the instructions may be stored in an additional suitable article of manufacture that includes at least one tangible, non-transitory computer-readable medium that at least collectively stores these instructions or routines in a manner similar to the memory 38 as described above. The control system 28 may also communicate with the sensors 30 and the actuators 32 via the hardware interface 40. In some embodiments, the control system 28 may also include a display 42 and a user input device 44 to allow an operator to interact with the control system 28.

In some embodiments, the control system 28 may be a distributed control system (DCS) or similar multiple controller systems, such that each component (e.g., gas engine 24, aftertreatment system 26, urea injection control system 34) or group of components in the power generation system 10 includes or is associated with a controller for controlling the specific component(s). In these embodiments, each controller includes a processor, memory, and a hardware interface similar to the processor 36, the memory 38, and the hardware interface 40 described above. Each controller may also include a communicative link to communicate with the other controllers.

Figure 3:
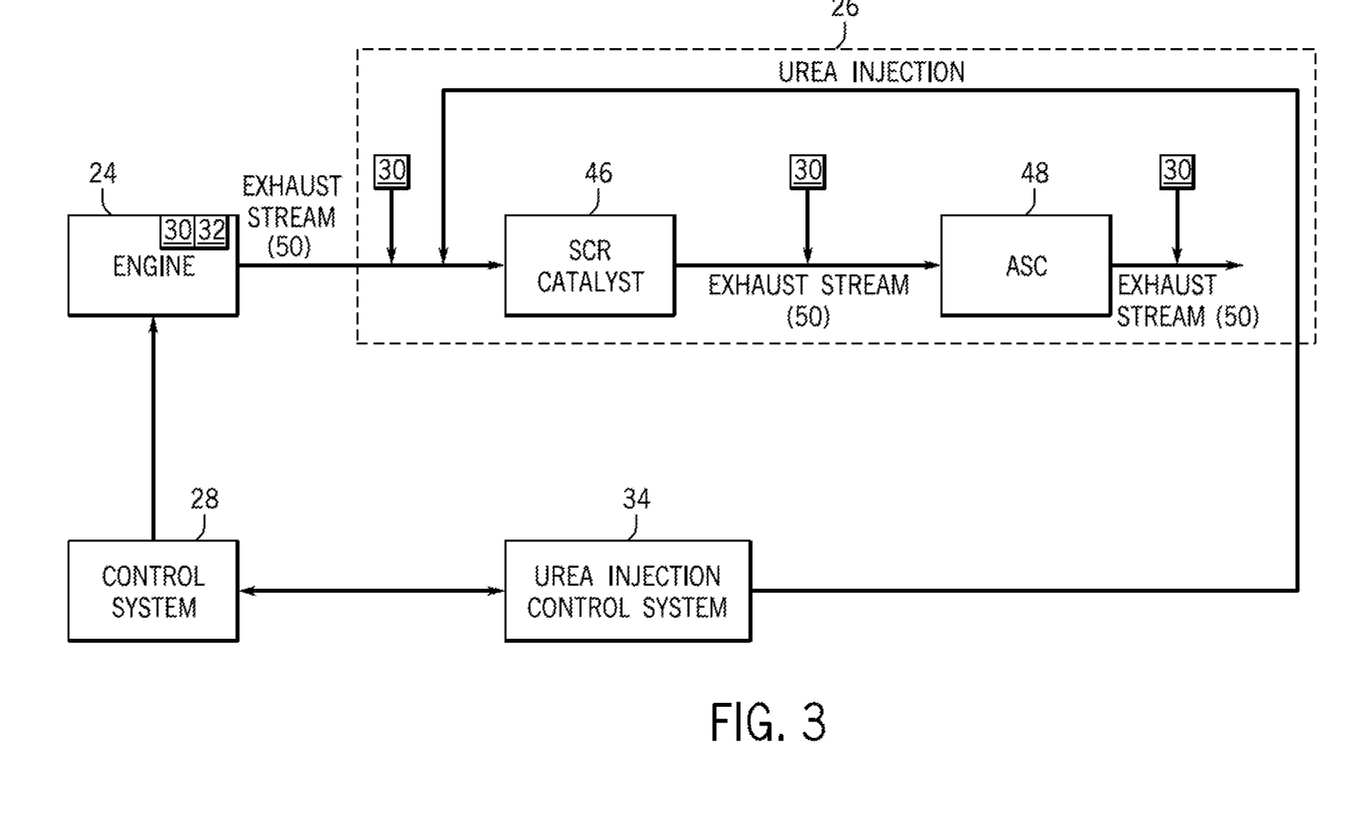
FIG. 3 is a schematic view of the aftertreatment system of the power generation system of FIG. 1, in accordance with an embodiment of the present approach.

Turning now to FIG. 3, the aftertreatment system 26 includes a selective catalytic reduction (SCR) catalyst 46 and an ammonia slip catalyst (ASC) 48 that receive and condition an exhaust gas stream 50 exiting the gas engine 24. Because FIG. 3 includes like elements to FIGS. 1 and 2, the like elements are depicted with like numbers. Although the depicted embodiment depicts an SCR catalyst 46 and an ASC 48, it should be appreciated that the aftertreatment system 26 may include any type of $NO_x$ reduction catalyst and ammonia oxidation catalyst, as well as other catalytic converter systems and other components, such as the HRSG mentioned above.

The SCR catalyst 46 is a particular type of exhaust catalyst used to convert nitrogen oxides into diatomic nitrogen ($N_2$) and water. In addition to being used in the gas engine system 24, SCR catalysts 46 may also be used in utility boilers, industrial boilers, municipal solid waste boilers, diesel engines, diesel locomotives, gas turbines, and automobiles. The SCR catalyst 46 may use ammonia to help trigger the reaction that converts the nitric oxides in the exhaust gases to $N_2$ and water. However, some ammonia may remain within the exhaust gas stream 50 that is not consumed in the chemical reaction. To convert the remaining ammonia to $N_2$, the aftertreatment system includes the ASC 48. The ASC 48 may be a zeolite style catalyst, in that it may use microporous, aluminosilicate minerals to provide the chemical reactions that oxidize the ammonia within the exhaust gases.

To cause the desired reactions within the SCR catalyst 46 and the ASC 48, urea is injected into the exhaust gas stream 50 upstream of the SCR catalyst 46. The injection may be continuous or discrete, and may be controlled by either the control system 28 and/or the urea injection control system 34, as will be described in further detail below. Further, while the embodiments described herein describe an injection of urea into the exhaust gas stream 50, it should be appreciated that the embodiments can be modified for any suitable gaseous reductant, such as anhydrous ammonia and aqueous ammonia. Additionally, the amount of urea injected into the exhaust gas stream 50 may be based on the volume of the urea, the mass of the urea, or the potential of chemical reduction due to the urea injection. Once the urea is injected into the exhaust gas stream 50, the exhaust gas stream 50 enters the SCR catalyst 46 and then the ASC catalyst 48, which convert the nitrogen oxides and ammonia within the exhaust gases to $N_2$ and water as described above.

As stated above, the urea injection control system 34 monitors the performance of the aftertreatment system 26. In particular, the urea injection control system 34 may determine the appropriate amount of urea to inject into the exhaust gas stream 50 based on the current $NO_x$ conversion rates of the catalysts, the operating characteristics (e.g., temperature, fluid flow, pressure, urea type) of the catalysts, and the desired conversion rates for the aftertreatment system 26. This, in turn, may reduce the amount of $NO_x$ that remains in the exhaust gases, enabling the power generation system 10 to achieve lower $NO_x$ emission values, particularly for power generation systems 10 that utilize lean-burn engines. The urea injection control system 34 may also determine the appropriate operating window for particular characteristics of the ASC 48 to maximize the selectivity of ammonia being converted to $N_2$. Further, the urea injection control system 34 may prompt diagnostic evaluations of and certain action (e.g., alarms, alerts, corrective actions) for the aftertreatment system 26.

The urea injection control system 34, as shown in FIG. 3, may be separate from the control system 28, and may contain a processor, memory, and a hardware interface similar to those of the control system 28. In other embodiments, the urea injection control system 34 may be part of the control system 28. For example, the urea injection control system 34 may reside in one of multiple controllers within a distributed control system, as described above, or may be provided as computer instructions executable via the control system 28.

In one example, the urea injection control system 34 may use the data collected by sensors 30 to determine the temperature of the exhaust gases after exiting the SCR catalyst 46 and the amount of $NO_x$ in the exhaust gases in an area or areas between the SCR catalyst 46 and the ASC catalyst 48. In other embodiments, the urea injection control system 34 may determine the measurements using virtual measurements derived from models (e.g., first principle models such as kinetic models, statistical models, neural networks, genetic algorithms, and/or data mining models) of the aftertreatment system 26 and its components, as well as models of the engine 24 and the engine system 18 as a whole.

The urea injection control system 34 may adjust the amount of urea injected into the exhaust gas stream 50 based on whether the temperature of the exhaust gas stream 50 after exiting the SCR catalyst 46 falls within a desired operating window. Similarly, the urea injection control system 34 may adjust the amount of urea injected into the exhaust gas stream 50 based on whether the NO values of the exhaust gases in areas between the SCR catalyst 46 and the ASC 48 are less (or more) than set reference values. The operating window and the reference values may be derived by using bench reaction experiments. In one embodiment, the bench reaction experiments are performed in the lab, and the results included in a table or other data structure stored in memory. In another embodiment, the bench reaction experiments may be performed in the field, and may additionally be performed in real-time to provide for real-time inclusion of the results.

Alternately or additionally, the operating window and the reference values may be derived using models of the aftertreatment system 26 and its components or the engine system 18 and its components (e.g., first principle models such as kinetic models, statistical models, neural networks, genetic algorithms, and/or data mining models). Although the present urea injection control system 34 adjusts the amount of urea injected into the exhaust gas stream 50 based on the temperature of the exhaust gas stream 50 after exiting the SCR catalyst and the NO values of the exhaust gas stream 50 in areas between the SCR catalyst 46 and the ASC 48, it should be appreciated that the urea injection control system 34 may be configured to adjust the amount of urea injected into the exhaust gas stream 50 based on other operating characteristics of the aftertreatment system 26, e.g., observed pressures, fluid flows, and so on.

In addition to adjusting the urea injection, the urea injection control system 34 may also adjust the ASC 48 operating temperature window to maximize ammonia selectivity to $N_2$, as mentioned above. As noted above, the ASC 48 converts ammonia to $N_2$; however, the ASC 48 may also convert ammonia to $NO_x$. Therefore, maximizing the ammonia selectivity to $N_2$ entails increasing the probability that the ASC 48 will convert the ammonia to $N_2$. Further, there may be a relationship between the operating temperature window of the ASC 48 and the ammonia selectivity to $N_2$. That is, the inlet temperature of the ASC 48 may affect the efficiency of the chemical reactions that occur within the ASC 48. For example, in some ASCs 48 that contain zeolite formulations, the ammonia selectivity to $N_2$ is maximized when the inlet temperature of the ASC 48 is between 400-510° C.

To maximize or otherwise improve the ammonia selectivity to $N_2$, the urea injection control system 34 may use the following formula:

$$S(\%) = 100 * \frac{NH_{3,ASCIN} - (NO_{ASCOUT} + NO_{2,ASCOUT} + N_2O_{ASCOUT} - NO_{ASCIN} - NO_{2,ASCIN} - N_2O_{ASCIN})}{NH_{3,ASCIN}}$$

That is, the urea injection control system 34 may determine the ammonia selectivity to $N_2$ based on the amount of nitrogen oxides present in the exhaust gas stream 50 both upstream and downstream of the ASC 48 and the amount of ammonia present in the exhaust gas stream 50 upstream of the ASC 48. The urea injection control system 34 may then adjust the operating temperature window for the ASC 48 based on the desired selectivity; the values of the operating temperature windows and the corresponding selectivity may be saved in the form of a look-up table in the memory 38. The relationship between the operating temperature window and selectivity may be derived via bench reaction experiments, including real-time experiments, or via models of the aftertreatment system 26, as described above, as well as current values of the temperature upstream and downstream of the ASC, as determined by sensors 30.

Further, as noted above, the urea injection control system 34 may perform or start diagnostic evaluations of the aftertreatment system 26 and its components based on the data collected. For example, as described below, the urea injection control system 34 may start a diagnostic evaluation of the ASC 48 if the $NO_x$ value of the exhaust gases after exiting the ASC 48 is less than a set reference value. Either the urea injection control system 34 or the control system 28 may perform the diagnostic evaluations. In some embodiments, the urea injection control system 34 may also prompt corrective action (e.g., a warning to an operator to schedule maintenance) based on the results of the diagnostic evaluations. Alternately, the control system 32 may prompt corrective action.

Indeed, the techniques described herein exploit the aspect of ASC 48 temperature window for maximum NH3 selectivity to N2 and commands extra urea injection when optimal NOx conversion across SCR catalysts is not achieved in an SCR-ASC aftertreatment network. This may be implemented by reading the temperature at SCR catalyst out, computing NOx conversion across SCR catalyst through sensing NOx before and after the SCR catalyst 46, comparing NH3 storage profiles, reading NOx sensor 30 at ASC out, and then commanding extra urea for more optimal NOx reduction if a certain logic is met, as described below with respect to FIG. 4.

Figure 4:
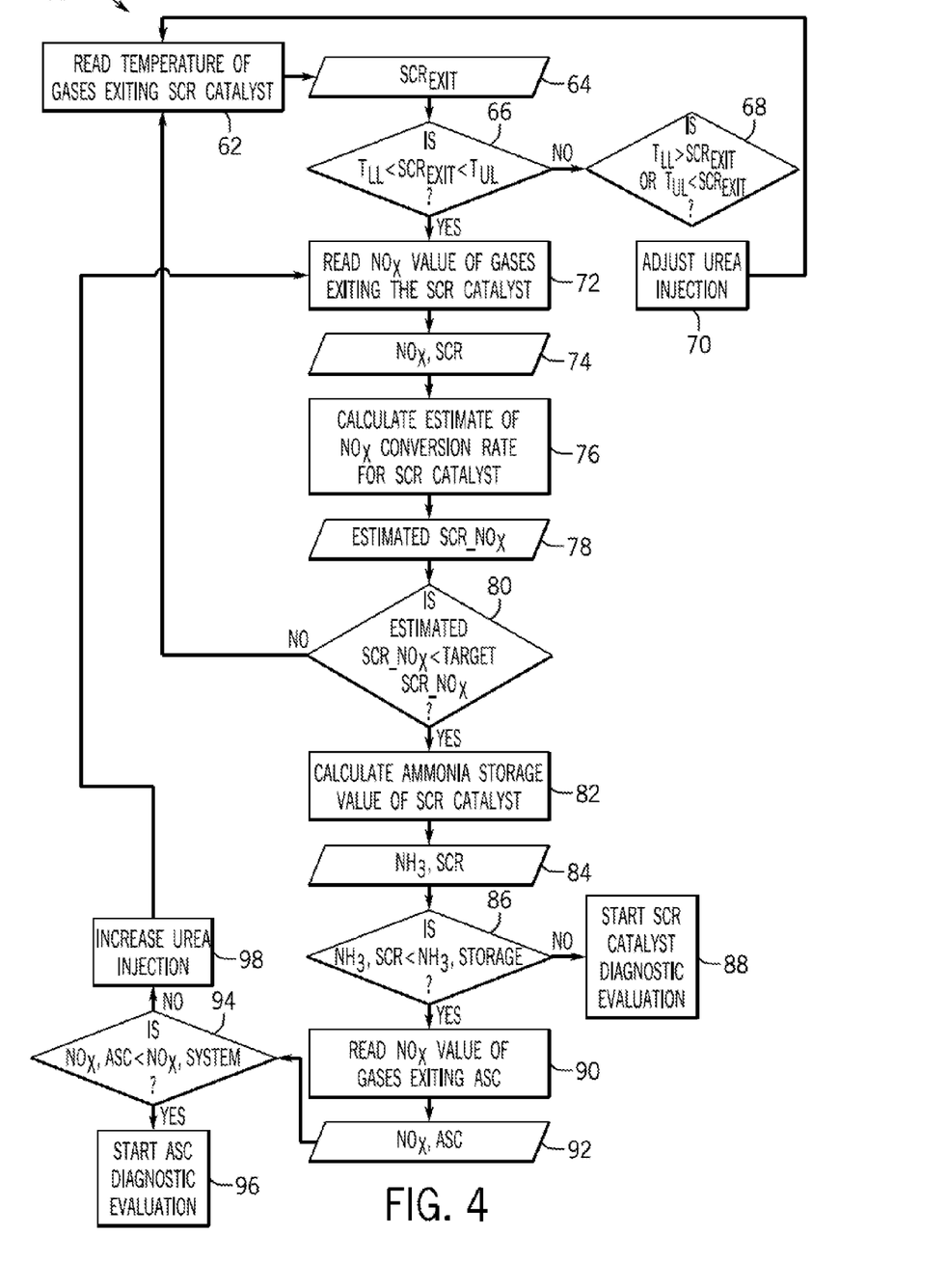
FIG. 4 is a flowchart illustrating a method of operation for a urea injection control system in the aftertreatment system of FIG. 3, in accordance with an embodiment of the present approach.

Turning now to FIG. 4, the figure is a flow chart of an embodiment of a process 60 suitable for execution by the urea injection control system 34 for controlling the aftertreatment system 26. Although the process 60 is described below in detail, the process 60 may include other steps not shown in FIG. 4. Additionally, the steps illustrated may be performed concurrently or in a different order. The process 60 may be implemented as computer instructions or executable code stored in the memory 38 and executed by the processor 36, as described above.

Beginning at block 62, the urea injection control system 34 determines the temperature of the exhaust gases after exiting the SCR catalyst 46, which is referred to below as the SCR exit temperature 64 and illustrated in FIG. 4 as $SCR_{EXIT}$. As mentioned above, the SCR exit temperature 64 may be determined based on readings from a temperature sensor 30, or from virtual measurements derived from a model of the aftertreatment system 26 and its components and the engine system 18 and its components.

At block 66, the urea injection control system 34 determines whether the SCR exit temperature 64 is between a lower limit and an upper limit. The temperature limits may be determined via bench reaction experiments either in real-time or offline, as described above, and may be stored on the memory 38. If the urea injection control system 34 determines that the SCR exit temperature 64 is not within the lower and upper limits, then it may proceed to block 68. At block 68, the process 60 (e.g., the urea injection control system 34) determines whether the SCR exit temperature 64 is below the lower limit or above the upper limit. Based on the determination at block 56, the urea injection control system 34 adjusts the amount of urea injected into the exhaust gas stream at block 70. The urea injection control system may then return to the beginning of the process 60 at block 62.

If the urea injection control system 34 determines that the SCR exit temperature 64 is within the lower and upper limits, then at block 72, the urea injection control system 34 determines the $NO_x$ value of the exhaust gases after exiting the SCR catalyst, which is referred to below as the SCR exit $NO_x$ value 74 and labeled in FIG. 4 as $NO_{x,SCR}$. As stated above, the SCR exit $NO_x$ value 74 may be determined via readings from a sensor 30, such as gas analyzer, or from virtual measurements derived from a model of the aftertreatment system 26 and its components and the engine system 18 and its components.

Using the SCR exit $NO_x$ value 74, at block 76, the urea injection control system 34 computes an estimate of the $NO_x$ conversion rate of the SCR catalyst 46, referred to below as the estimated SCR $NO_x$ conversion rate 78 and labeled as estimated $SCR\_NO_x$. At block 80, the urea injection control system 34 determines whether the estimated SCR $NO_x$ conversion rate is less than a target SCR $NO_x$ conversion rate, illustrated in FIG. 4 as target $SCR\_NO_x$. If not, then the urea injection control system 34 then returns to determining the SCR exit temperature 64 at block 62.

If the urea injection control system 34 determines that the estimated SCR $NO_x$ conversion rate is less than the target SCR $NO_x$ conversion rate, then, at block 82 the urea injection control system 34 determines the amount of ammonia stored in the SCR catalyst 46, referred to below as the ammonia storage value 84 and labeled in FIG. 4 as $NH_{3,SCR}$. As mentioned above, the SCR catalyst 46 uses ammonia to trigger the chemical reaction of converting nitrogen oxides to $N_2$ and water. Therefore, if a large amount of ammonia remains within the SCR catalyst 46 after the exhaust gases pass through the SCR catalyst 46, then it may be an indication that the SCR catalyst 46 is not functioning as desired. Accordingly, at block 86, the urea injection control system 34 determines whether the ammonia storage value is less than an ammonia storage reference value, labeled in FIG. 4 as $NH_{3,STORAGE}$. If so, then the urea injection control system 34 may begin a diagnostic evaluation of the SCR catalyst 46 at block 88. The diagnostic evaluation of the SCR catalyst 46 may be performed by either the urea injection control system 34 or the control system 28. Further, either the urea injection control system 34 or the control system 28 may prompt corrective action (e.g., an operator warning to schedule maintenance) based on the results of the diagnostic evaluation, as mentioned above.

If the urea injection control system 34 determines that the ammonia storage value is not less than an ammonia storage reference value, then, at block 90, the urea injection control system 34 determines the $NO_x$ value of the exhaust gases after exiting the ASC 48, which is referred to below as the ASC exit $NO_x$ value 92 and labeled in FIG. 4 as $NO_{x,ASC}$. As mentioned above, the ASC exit $NO_x$ value 92 may be derived from readings by a sensor 30, such as a gas analyzer, or from models of the aftertreatment system 26 and its components and the engine system 18 and its components.

At block 94, the urea injection control system 34 determines whether the ASC exit $NO_x$ value 92 is less than the system $NO_x$ reference value, which may be representative of the desired amount of $NO_x$ present in the exhaust gases after passing through the aftertreatment system 26 and is illustrated in FIG. 4 as $NO_{x,SYSTEM}$. If it is, then the urea injection control system 34 may begin a diagnostic evaluation of the ASC 48 at block 96. As mentioned above, either the urea injection control system 34 or the control system 28 may perform diagnostic evaluations, and either may prompt corrective action based on the results of the diagnostic evaluation.

If the urea injection control system 34 determines that the ASC exit $NO_x$ value is not less than the system $NO_x$ reference value, then the urea injection control system 34 may increase the amount of urea injected into the exhaust gases at block 98. The increase may enable the SCR catalyst 46 to achieve the desired conversion rate while still allowing the ASC 48 to oxidize any remaining ammonia in the exhaust gases downstream of the SCR catalyst 46. The urea injection control system 34 then returns to determining the SCR exit $NO_x$ value 74 at block 72.

Technical effects of the invention include monitoring and adjusting the operation of an aftertreatment system of a power generation system. Certain embodiments enable improving the performance of an aftertreatment system by adjusting the amount of urea injected into exhaust gases prior to treatment by the aftertreatment system based on operating characteristics of the aftertreatment system. For example, the present urea injection control system may adjust the amount of urea injected into exhaust gases based on the temperature of the exhaust gases after exiting an SCR catalyst as well as the nitrogen oxide conversion rates of an SCR catalyst and an ASC. Other embodiments enable adjusting operating characteristics of the aftertreatment system to improve the conversion rates of various components. For instance, the present urea injection control system may determine the probability that an ASC converts ammonia to $N_2$ and may adjust the operating temperature window of the ASC to increase the probability. The technical effects and technical problems in the specification are exemplary and not limiting. It should be noted that the embodiments described in the specification may have other technical effects and can solve other technical problems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a nitrogen oxide reduction catalyst fluidly coupled to an exhaust conduit of an engine system and configured to reduce nitrogen oxides in the engine exhaust;
an ammonia oxidation catalyst fluidly coupled to the exhaust conduit downstream of the nitrogen oxide reduction catalyst and configured to reduce an ammonia in the engine exhaust; and
a reductant injection control system configured to:
  read a first temperature of an exhaust exiting the nitrogen oxide reduction catalyst;
  if the first temperature is less than an upper temperature value and greater than a lower temperature value then to:
  a) determine a nitrogen oxide conversion rate of the nitrogen oxide reduction catalyst;
  b) determine an ammonia storage value of the nitrogen oxide reduction catalyst; and
  c) increase, decrease, or a combination thereof, the injection of reductant based on the nitrogen oxide conversion rate, and the ammonia storage value.

2. The system of claim 1, wherein the reductant injection control system is configured to determine an ammonia oxidation catalyst temperature window increase based on one of or both of the first temperature and an ammonia oxidation catalyst temperature window.

3. The system of claim 2, wherein the reductant injection control system is configured to determine a second temperature of the engine exhaust downstream of the ammonia oxidation catalyst and to determine the ammonia oxidation catalyst temperature window based on the first and the second temperatures.

4. The system of claim 3, wherein the reductant injection control system is configured to determine the ammonia oxidation catalyst temperature window to increase an ammonia selectivity of the ammonia oxidation catalyst.

5. The system of claim 1, wherein the reductant injection control system is configured to use a model of the aftertreatment system, a model of the engine system, or a combination thereof, to determine the nitrogen oxide conversion rate, the ammonia storage, the first temperature, or any combination thereof.

6. The system of claim 1, wherein the reductant injection control system is configured to increase the injection of reductant when the nitrogen oxide conversion rate is below a reference value.

7. The system of claim 1, wherein the reductant injection control system is configured to start a diagnostic evaluation of the nitrogen oxide reduction catalyst, the ammonia oxidation catalyst, or any combination thereof, based on the nitrogen oxide conversion rate and the first temperature.

8. The system of claim 7, wherein the reductant injection control system is configured to start the diagnostic evaluation of the nitrogen oxide reduction catalyst based on the ammonia storage value.

9. The system of claim 1, wherein the engine system comprises a lean-burn engine system.

10. A method, comprising:
reading a first temperature of an exhaust exiting a nitrogen oxide reduction catalyst, wherein an ammonia oxidation catalyst is fluidly coupled to the nitrogen oxide reduction catalyst, and the ammonia oxidation catalyst is positioned downstream of the nitrogen oxide catalyst and configured to reduce ammonia in the engine exhaust;
if the first temperature is less than an upper temperature value and greater than a lower temperature value then:

a) determining a nitrogen oxide conversion rate of a nitrogen oxide reduction catalyst configured to receive the engine exhaust and reduce nitrogen oxides in the engine exhaust;
b) determining an ammonia storage value of the nitrogen oxide reduction catalyst; and
c) increasing or decreasing the reductant injection based on the nitrogen oxide conversion rate, the ammonia storage value, and the first temperature.

11. The method of claim 10, comprising receiving a second input corresponding to an amount of nitrogen oxides in the engine exhaust downstream of the nitrogen oxide reduction catalyst and determining the nitrogen oxide conversion rate based on the amount of nitrogen oxides.

12. The method of claim 10, comprising adjusting a temperature window of the ammonia oxidation catalyst based on the nitrogen oxide conversion rate and the first temperature.

13. The method of claim 12, comprising adjusting the temperature window to maximize the ammonia selectivity of the ammonia oxidation catalyst.

14. The method of claim 10, comprising starting a diagnostic evaluation of the nitrogen oxide reduction catalyst, the ammonia oxidation catalyst, or a combination thereof, based on the ammonia storage value.

15. A non-transitory computer-readable medium comprising computer executable code comprising instructions configured to:
read a first temperature of an exhaust exiting a nitrogen oxide reduction catalyst, wherein an ammonia oxidation catalyst is fluidly coupled to the nitrogen oxide reduction catalyst, and the ammonia oxidation catalyst is positioned downstream of the nitrogen oxide catalyst and configured to reduce ammonia in the engine exhaust;
if the first temperature is less than an upper temperature value and greater than a lower temperature value then to:
a) determine a nitrogen oxide conversion rate of a nitrogen oxide reduction catalyst configured to receive the engine exhaust and reduce nitrogen oxides in the engine exhaust;
b) determine an ammonia storage value of the nitrogen oxide reduction catalyst; and
c) increase or decrease the reductant injection based on the nitrogen oxide conversion rate, the ammonia storage value, and the first temperature.

16. The non-transitory computer-readable medium of claim 15, comprising instructions configured to start the diagnostic evaluation of the ammonia oxidation catalyst based on the nitrogen oxide conversion rate, the first temperature, or any combination thereof.

17. The non-transitory computer-readable medium of claim 15, comprising instructions configured to determine an amount of nitrogen oxide in the engine exhaust downstream of the ammonia oxidation catalyst and increase the injection of urea based on the amount of nitrogen oxide.

18. The non-transitory computer-readable medium of claim 15, comprising instructions configured to adjust a temperature window of the ammonia oxidation catalyst based on the nitrogen oxide conversion rate and the first temperature.

19. The non-transitory computer-readable medium of claim 18, comprising instructions configured to adjust the temperature window to maximize an ammonia selectivity of the ammonia oxidation catalyst.

20. The non-transitory computer-readable medium of claim 15, comprising instructions configured to increase the injection of reductant when the nitrogen oxide conversion rate is below a reference value.

* * * * *